(12) United States Patent
Tang et al.

(10) Patent No.: US 8,649,189 B2
(45) Date of Patent: Feb. 11, 2014

(54) POWER SUPPLY WITH SINGLE STAGE CONVERTER FOR PERFORMING POWER FACTOR CORRECTION AND RESONANT CONVERSION

(75) Inventors: Pak-Chuen Tang, Hong Kong (CN); Kwong-Ming Ching, Hong Kong (CN); Chung-Hei Poon, Hong Kong (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 289 days.

(21) Appl. No.: 13/017,954

(22) Filed: Jan. 31, 2011

(65) Prior Publication Data

US 2012/0106206 A1 May 3, 2012

(30) Foreign Application Priority Data

Oct. 27, 2010 (CN) .......................... 2010 1 0528512

(51) Int. Cl.
*H02M 3/335* (2006.01)
(52) U.S. Cl.
USPC ........................... 363/21.02; 323/351; 363/41
(58) Field of Classification Search
USPC .......... 363/21.02, 21.03, 39, 40, 41; 323/351; 307/105
See application file for complete search history.

(56) References Cited

U.S. PATENT DOCUMENTS

| | | | | |
|---|---|---|---|---|
| 6,465,990 B2* | 10/2002 | Acatrinei et al. | .............. | 323/222 |
| 7,283,379 B2* | 10/2007 | Baker et al. | ...................... | 363/98 |
| 7,518,263 B2* | 4/2009 | Gan et al. | ......................... | 307/32 |
| 7,558,037 B1* | 7/2009 | Gong et al. | .................... | 361/93.1 |
| 7,570,497 B2* | 8/2009 | Jacques et al. | .............. | 363/21.03 |
| 7,848,117 B2* | 12/2010 | Reinberger et al. | ............. | 363/16 |
| 8,212,492 B2* | 7/2012 | Lam et al. | ...................... | 315/247 |
| 2004/0174720 A1* | 9/2004 | Kurokami et al. | ............... | 363/16 |
| 2009/0040796 A1* | 2/2009 | Lalithambika et al. | ..... | 363/21.17 |
| 2009/0200960 A1* | 8/2009 | King | ............................. | 315/291 |
| 2009/0230941 A1* | 9/2009 | Vogel | .............................. | 323/305 |
| 2010/0225240 A1* | 9/2010 | Shearer et al. | ................ | 315/247 |
| 2011/0176343 A1* | 7/2011 | Kojima | .......................... | 363/132 |
| 2012/0043900 A1* | 2/2012 | Chitta et al. | .................. | 315/201 |

FOREIGN PATENT DOCUMENTS

| | | |
|---|---|---|
| CN | 101106846 | 1/2008 |
| CN | 101588139 | 11/2009 |
| CN | 101766060 | 6/2010 |

* cited by examiner

*Primary Examiner* — Gary L Laxton
*Assistant Examiner* — Kyle J Moody
(74) *Attorney, Agent, or Firm* — Evan R. Witt; Kirton McConkie

(57) ABSTRACT

A power supply has a single stage converter for performing power factor correction to reduce high-frequency harmonics in the input current and performs resonant conversion to achieve zero-voltage switching or zero-current switching for power conversion. The inventive single stage converter includes a switching circuit, a resonant circuit, a power control circuit, and a square wave generator. The switching circuit includes at least one switch and the resonant circuit includes a LLC resonant tank. The power control circuit includes a proportional differential circuit such as a power amplifier configured in a negative feedback topology, and the square wave generator is configured to generate driving signals based on the frequency modulation control signal generated by the comparison of the sensed input current and a user-defined power level input, thereby allowing the square wave generator to regulate the switching operation of the switching circuit.

13 Claims, 8 Drawing Sheets

POWER SUPPLY WITH SINGLE STAGE CONVERTER FOR PERFORMING POWER FACTOR CORRECTION AND RESONANT CONVERSION

FIELD OF THE INVENTION

The invention relates to a power supply, and more particularly to a power supply with a single stage converter for performing power factor correction and resonant conversion.

BACKGROUND OF THE INVENTION

The conventional high-voltage power supply generally employs a two-stage converter to convert an input voltage into an output voltage. As shown in FIG. 1, a power supply 100 is configured to convert an AC voltage Vin into an output voltage Vo. The power supply 100 includes a bridge rectifier 120, a power factor correction converter 140, a resonant converter 160, a transformer T100, and an output capacitor C100. The output voltage Vo is used to drive a load Z100. The bridge rectifier 120 is configured to rectify the AC voltage Vin into a full-wave rectified DC voltage. The power factor correction converter 140 is connected to the output end of the bridge rectifier 120 and includes a boost choke Ls, a control switch S100, a diode D100, and a filtering capacitor Cs. The boost choke Ls is used to store the full-wave rectified DC voltage outputted from the bridge rectifier 120 and transfer the stored energy to the filtering capacitor Cs through the diode D100 according to the switching operation of the control switch S100. With the capacitive impedance of the filtering capacitor Cs, the high-frequency harmonics of the input current can be suppressed, thereby improving the power factor of the input voltage Vin. The resonant converter 160 is connected to the output end of the power factor correction converter 140 and includes control switches S102, S104, filtering capacitors C1, C2, a resonant inductor Lr, and resonant capacitors Cs, Cp. The resonant tank formed by the resonant inductor Lr and the resonant capacitors Cs, Cp is used to generate resonance to drive the control switches S102, S104 to switch at the time when the voltage or current of the resonant tank is zero, thereby reducing the switching loss and accomplishing the voltage conversion. Thus, the energy of the AC voltage Vin can be transferred to the secondary side of the transformer. The transformer T100 includes a primary winding Np100 and a secondary winding Ns100, in which the primary winding Np100 is used to store the energy of the AC voltage Vin transmitted from the resonant converter 160 and transfer the stored energy to the secondary winding Ns100 according to the switching operation of the control switches S102, S104, thereby inducing a voltage across the secondary winding Ns100. Therefore, the induced voltage is outputted to the load Z100 through the output capacitor C100, and thus the load Z100 is powered.

The power supply of FIG. 1 is made up of a two-stage converter in which the first stage converter is implemented by a power factor correction converter 140 and the second stage converter is implemented by a resonant converter 160. As a result, the power conversion efficiency of the power supply of FIG. 1 is derived as the product of the power conversion efficiency of the first stage converter and the power conversion efficiency of the second stage converter. Therefore, the power conversion efficiency of the power supply of FIG. 1 is lessened as a result of the multiplication. Also, because the two-stage converter is employed to achieve the power conversion for the power supply, the number of the circuit elements of the power supply is increased, thereby inflating the cost and boosting power loss.

SUMMARY OF THE INVENTION

An aspect of the invention is to provide a power supply with a single stage converter for performing power factor correction and resonant conversion to lower power loss, descend cost, or reduce the number of circuit elements.

To this end, one embodiment of the invention provides a power supply having a single stage converter connected to an input voltage, in which the single stage converter includes a switch circuit capable of transferring the energy of the input voltage according to the switching operation of the switch circuit. The power supply also includes a transformer connected to the single stage converter and having a primary side and a secondary side for storing the energy transferred from the single stage converter at the primary side and transferring the energy stored at the primary side to the secondary side according to the switching operation of the switch circuit, thereby generating an output voltage. The single stage converter also includes a resonant circuit connected between the switch circuit and the primary side of the transformer for generating resonance to transfer the energy of the input voltage to the primary side of the transformer. The single stage converter also includes a power control circuit for comparing an input current sensing signal indicative of a sensed input current of the power supply and a power level control input to generate a frequency modulation control signal. The frequency modulation control signal is capable of controlling of the output power of the power supply and the suppression of harmonics of the input current of the power supply. The single stage converter also includes a square wave generator connected to the power control circuit for generating a driving signal for driving the switch circuit according to the frequency modulation control signal, in which the frequency of the driving signal is varied synchronously with the frequency of the frequency modulation control signal. Thus, the harmonics of the input current of the power supply can be suppressed and the switching frequency of the switch circuit can be regulated, thereby regulating the output power of the power supply.

Now the foregoing and other features and advantages of the present invention will be best understood through the following descriptions with reference to the accompanying drawings, wherein:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
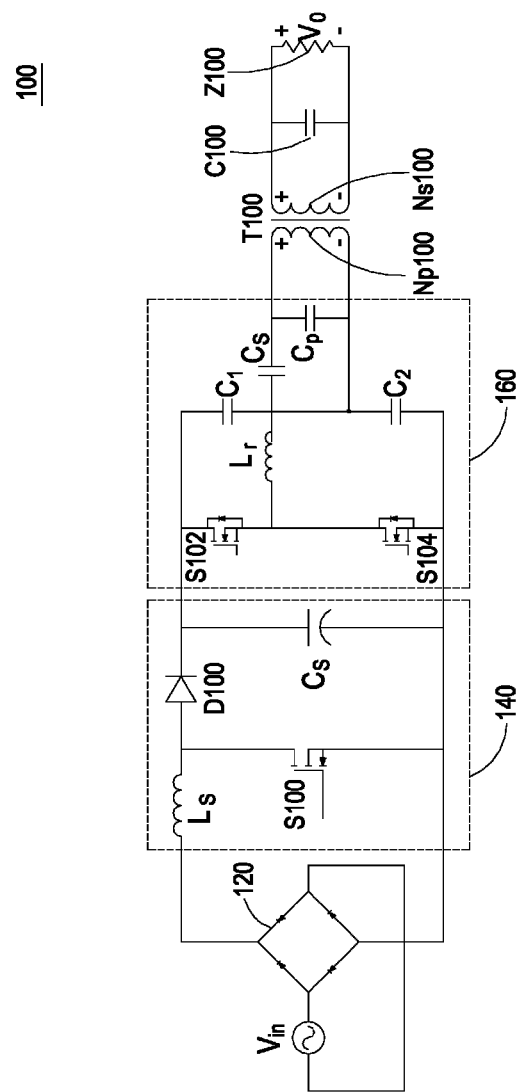
FIG. 1 is a circuit block diagram showing a power supply with a two-stage converter according to the prior art.
Figure 2:
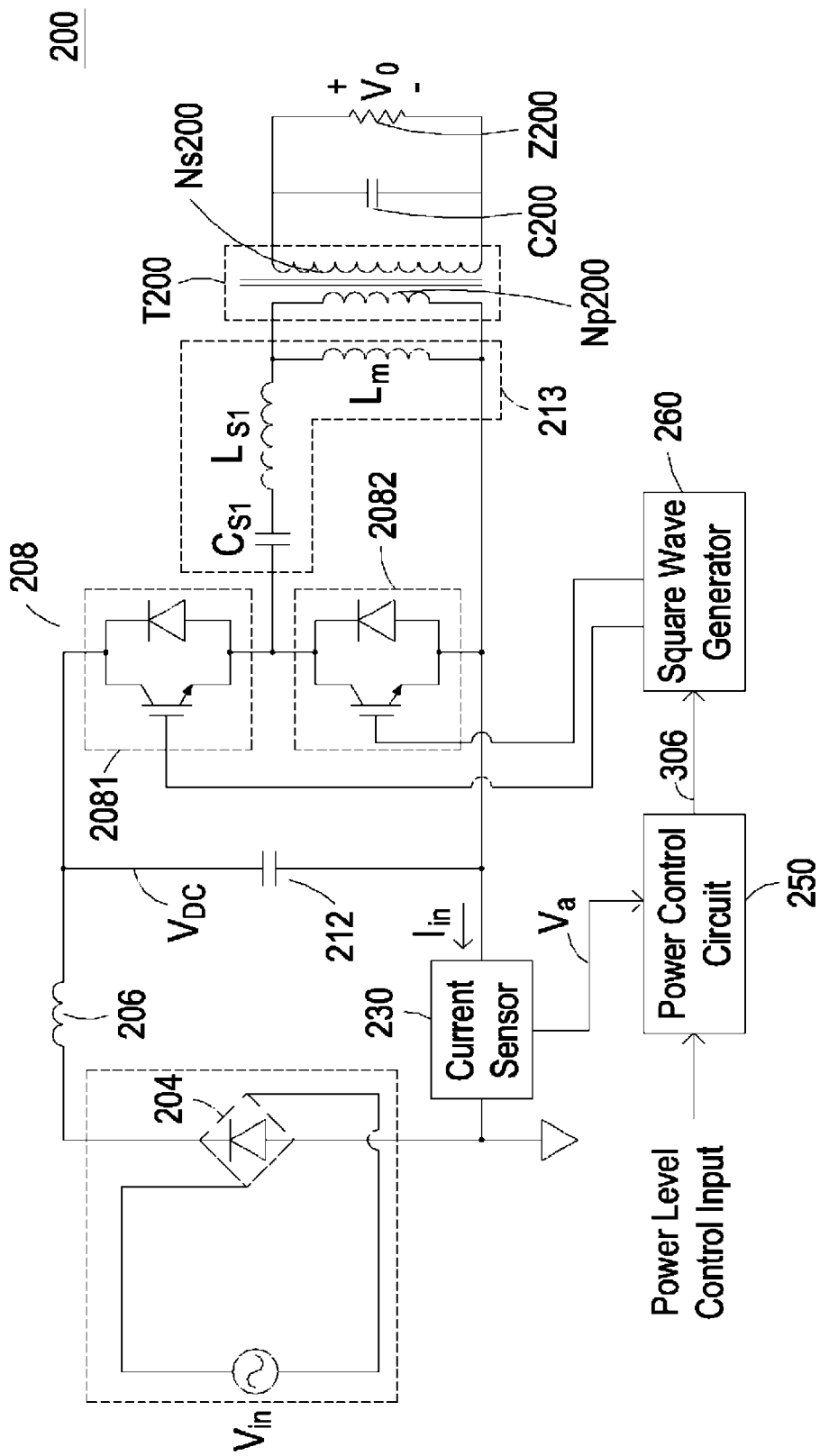
FIG. 2 is a circuit block diagram showing a power supply with a single-stage converter according to a first embodiment of the invention.

FIG. 2 shows the circuit blocks of the power supply 200 according to a first embodiment of the invention. It should be noted that the same reference number is given to label similar circuit elements throughout the entire specification. In FIG. 2, an input AC voltage Vin is supplied to the input terminal of the power supply. The power supply 200 is configured to convert the AC voltage Vin into an output voltage Vo developed across the output capacitor C200 for powering the load Z200. The power supply 200 includes a bridge rectifier 204 for rectifying the input AC voltage Vin into a full-wave rectified DC voltage. The power supply 200 further includes a filtering inductor 206 and a filtering capacitor 212 that constitute a filter circuit and are connected to the output end of the bridge rectifier 204 for suppressing the electromagnetic interference and the high-frequency noises of the input AC voltage Vin and generating a DC Voltage VDC analogous to the full-wave rectified DC voltage outputted from the bridge rectifier 204 or the half-wave rectified DC voltage generated by half-wave rectifying the input voltage Vin. For example, the filter circuit (206, 212) may be used to remove high-frequency noises with frequency above the frequency of the input voltage Vin (for example 60Hz). The power supply 200 also includes a current sensor 230 for sensing the input current Iin and thus generating an input current sensing signal Va indicative of the sensed input current. The power supply 200 also includes a switch circuit 208 consisted of a high-side switch 2081 and a low-side switch 2082. The power supply 200 also includes a transformer T200 having a primary winding Np200 and a secondary winding Ns200. The power supply 200 also includes a LLC resonant tank 213 which may be a series LLC resonant circuit or a parallel LLC resonant circuit. The LLC resonant tank consists of a first resonant capacitor Cs 1, a first resonant inductor Ls 1, and a second resonant inductor Lm. In this embodiment, one end of the first resonant capacitor Cs1 is connected to a junction node located between the high-side switch 2081 and the low-side switch 2082, and the other end of the first resonant capacitor Cs1 is connected to one end of the first resonant inductor Ls1. One end of the first resonant inductor Ls1 is connected to the other end of the first resonant capacitor Cs1, and the other end of first resonant inductor Ls1 is connected to the primary side Np200 of the transformer T200. The first resonant inductor Ls1 may be the leakage inductance of the transformer T200 and the second resonant inductor Lm may be the magnetizing inductance of the transformer T200. The first resonant capacitor Cs1 may function as a DC blocking capacitor for preventing the DC component of the input AC voltage Vin to enter the transformer T200. The LLC resonant tank 213 is used to transfer the energy of the input AC voltage Vin to the primary side Np200 of the transformer T200 by way of resonance according to the switching operation of the switch circuit 208. In operation, the high-side switch 2081 and the low-side switch 2082 of the switch circuit 208 are configured to switch alternately. That is, the high-side switch 2081 and the low-side switch 2082 of the switch circuit 208 are turned on and off in an alternate way. This would allow the LLC resonant tank 213 to be selectively connected to the filtering inductor 206 or the current sensor 230 through the high-side switch 2081 or the low-side switch 2082. The power supply 200 also includes a power control circuit 250 and a square wave generator 260 that constitute a control circuit. The power control circuit 250 is used to receive the input current sensing signal Va from the current sensor 230 and an external power level control input for generating a frequency modulation control signal 306. The square wave generator 260 is connected between the power control circuit 250 and the control terminal of the switch circuit 208 for generating a driving signal for driving the switch circuit 208 according to the frequency modulation control signal 306. The frequency of the driving signal is varied synchronously with the frequency of the frequency modulation control signal 306. As the frequency modulation control signal 306 is varied depending on the input current sensing signal Va and the external power level control input, the frequency of the driving signal is varied depending on the input current sensing signal Va and the external power level control input. As the frequency modulation control signal 306 carries the information about the power control and the waveform analogous to the full-wave rectified DC voltage outputted from the bridge rectifier 204, the frequency modulation control signal 306 can be used for the control of output power of the power supply 200 and the suppression of the harmonics of the input current Iin. Hence, the power control circuit 250 and the square wave generator 260 fulfill the demands of power factor correction for the input voltage Vin. Compared to the example of the prior art power supply 100 of FIG. 1, the power supply 200 of FIG. 2 integrates the power factor correction converter 140 and the resonant converter 160 into a single-stage converter consisted of a switch circuit 208, a LLC resonant tank 213, a power control circuit 250, and a square wave generator 260. Therefore, the inventive power supply has less circuit elements, lower manufacturing cost, or better power conversion efficiency.

Figure 3:
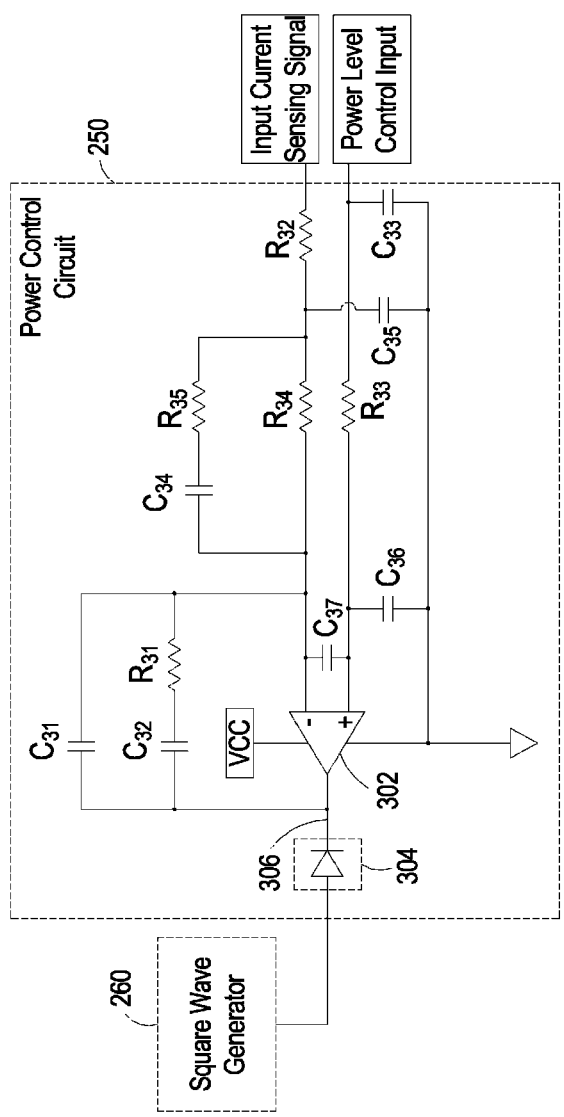
FIG. 3 is a circuit diagram showing the circuitry of the power control circuit according the first embodiment of the invention.

FIG. 3 shows the circuitry of the power control circuit 250. As shown in FIG. 3, the power control circuit 250 includes a proportional differential circuit (proportional subtractor circuit) and a reverse current isolation device 304. The proportional subtractor circuit includes a power amplifier (or an operational amplifier) 302, a plurality of resistors R31-R35, and a plurality of capacitors C31-C37. It should be noted that the proportional differential circuit is configured in a negative feedback topology. The power amplifier 302 has a negative input terminal for receiving the input current sensing signal Va from the input current sensor 230 and a positive input terminal for receiving the external power level control input. The external power level control input represents the magnitude of the output power desired by the user. For example, if the external power level control input is a 5V voltage, it indicates that the output power desired by the user is 100 W. The power amplifier 302 is configured to compare the input current sensing signal Va outputted from the input current sensor 230 and the external power level control input inputted by the user, and output the frequency modulation control signal 306 in response to the comparison. In other words, the frequency modulation control signal 306 is the proportional difference between the power level control input and the input current sensing signal Va. The reverse current isolation device 304 is an optional element and may be implemented by a diode. The reverse current isolation device 304 is connected between the power amplifier 302 and the square wave generator 260 for preventing a reverse current from flowing from the square wave generator 260 to the power amplifier 302. The frequency modulation control signal 306 is transmitted to the square wave generator 260 in order to allow the square wave generator 260 to regulate the switching frequency of the driving signal used to drive the switch circuit 208 according to the frequency modulation control signal 306, and suppress the harmonics of the input current Iin accordingly.

Figure 4:
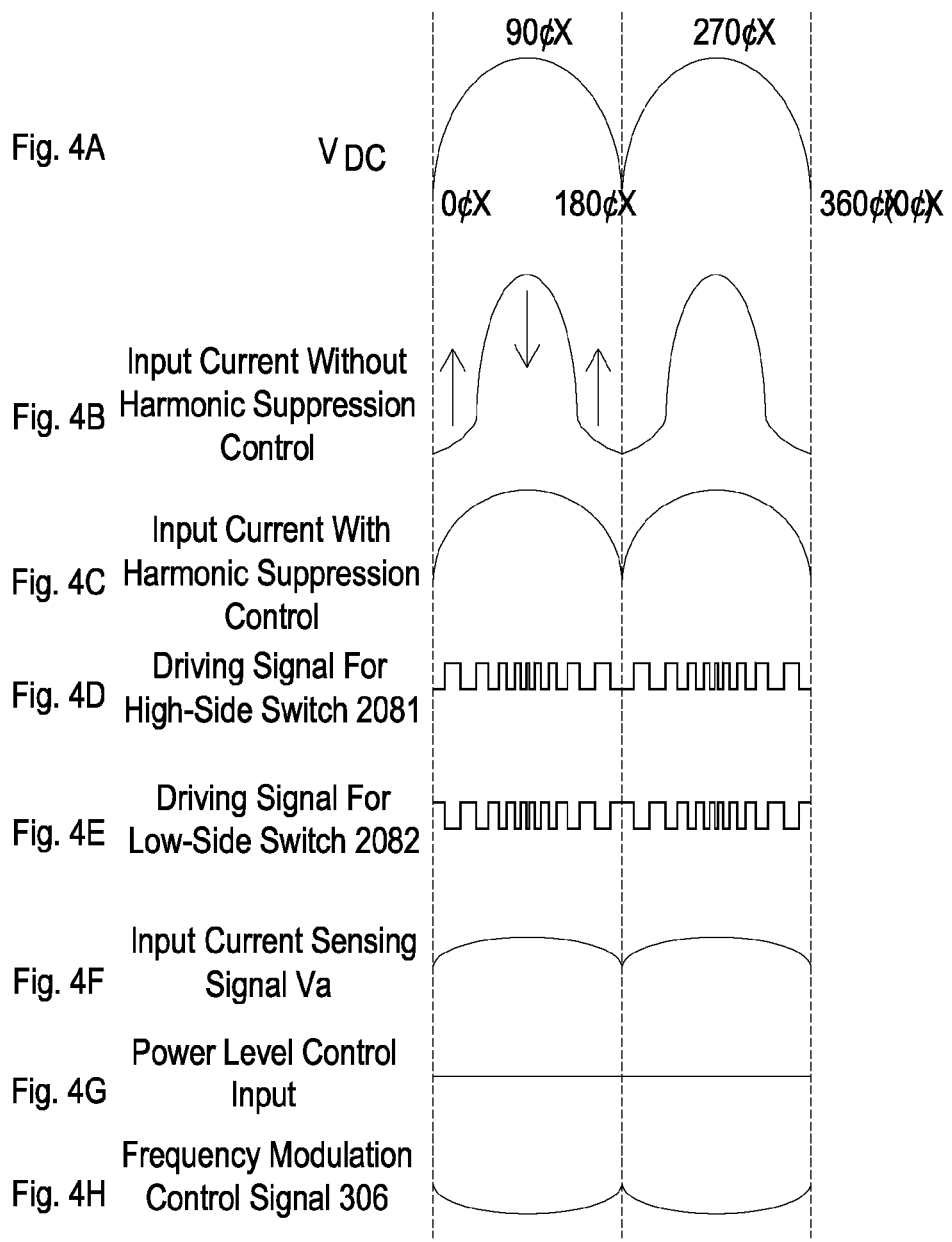
FIG. 4 shows the current waveforms and voltage waveforms measured at the circuit nodes of the power supply according to the first embodiment of the invention.

FIGS. 4A-4H illustrate the current waveforms and voltage waveforms measured at the circuit nodes of the power supply disclosed in the foregoing embodiment. FIG. 4A illustrates the voltage waveform of the DC voltage $V_{DC}$ which is generated by removing the high-frequency noises from the full-wave rectified DC voltage outputted from the bridge rectifier 204. The frequency of the DC voltage $V_{DC}$ is, for example, 60 Hz or 120 Hz, and is equal to or double of the frequency of the input AC voltage Vin. FIG. 4B shows the current waveform of the uncorrected input current Iin as the power control circuit 250 and the square wave generator 260 is not applied to the power supply, and FIG. 4C shows the current waveform of the corrected input current Iin as the power control circuit 250 and the square wave generator 260 is applied to the power supply. It can be readily known from FIGS. 4B and 4C that as the power control circuit 250 and the square wave generator 260 is applied to the AC-DC converter, the current waveform of the input current of FIG. 4B will be smoothed and resembles the voltage waveform of the DC voltage $V_{DC}$ of FIG. 4A or the full-wave DC voltage generated by full-wave rectifying the input voltage Vin. As shown in FIG. 4C, the waveform of the corrected input current is analogous to the waveform of a sinusoidal wave after being full-wave rectified, and the high-frequency noises of the input current is suppressed. FIG. 4F shows the current waveform of the input current sensing signal Va which is derived by sampling or attenuating the corrected input current Iin of FIG. 4C. FIG. 4G shows the waveform of the power level control input inputted by the user which indicates the magnitude of the output power desired by the user. FIG. 4H shows the waveform of the frequency modulation control signal 306 outputted from the power amplifier 302. FIG. 4D is the waveform of the driving signal of the high-side switch 2081 and FIG. 4E is the waveform of the driving signal of the low-side switch 2082. It can be understood from FIGS. 4D and 4E that the high-side switch 2081 and the low-side switch 2082 are turned on and off alternately. Also, the duty ratio of the driving signals of the switch circuit 208 is fixed at a constant value, for example, 50%. However, the switching frequency of the high-side switch 2081 and the low-side switch 2082 is regulated according to the frequency modulation control signal 306. When the DC voltage $V_{DC}$ or the full-wave rectified DC voltage generated by full-wave rectifying the input AC voltage Vin is increased, the switching frequency of the high-side switch 2081 and the low-side switch 2082 is increased. When the DC voltage $V_{DC}$ or the full-wave rectified DC voltage derived from the rectification to the input AC voltage Vin is decreased, the switching frequency of the high-side switch 2081 and the low-side switch 2082 is decreased. Hence, the power supply of the invention is capable of achieving the purpose of output power regulation by regulating the switching frequency of the high-side switch 2081 and the switching frequency of the low-side switch 2082 according to the power level desired by the user. More advantageously, the harmonics of the input current Iin can be regulated or suppressed.

Figure 5:
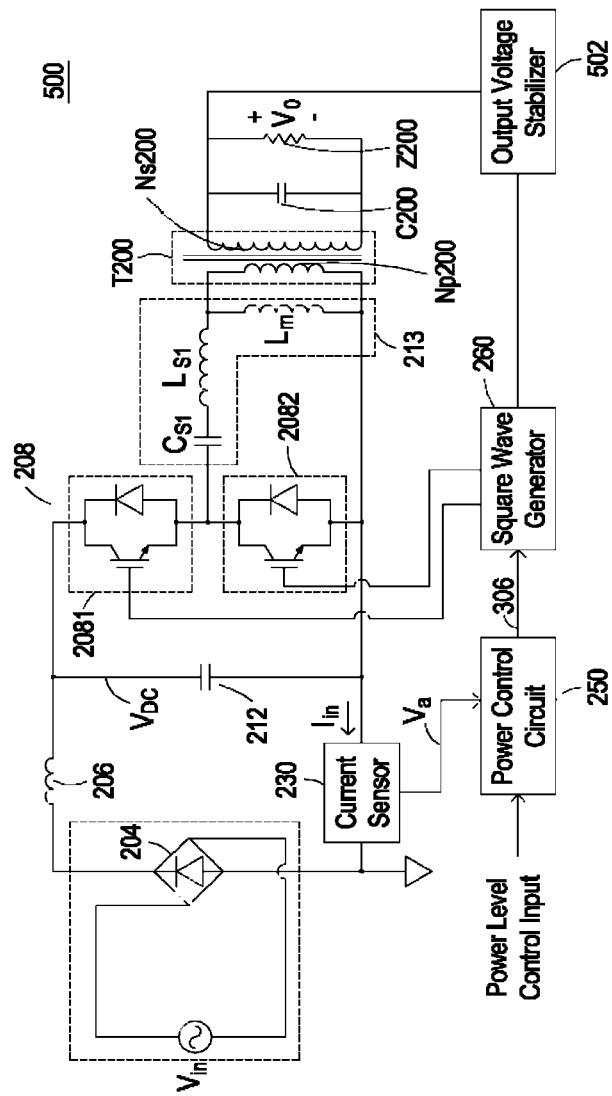
FIG. 5 is a circuit block diagram showing a power supply with a single-stage converter according to a second embodiment of the invention.

FIG. 5 shows the circuit blocks of a power supply 500 according to a second embodiment of the invention. Compared to the first embodiment of FIG. 2, the output voltage Vo of the power supply 500 of FIG. 5 is an AC voltage, and the power supply 500 includes an output voltage stabilizer 502 which is connected between the load Z200 and the square wave generator 260. The output voltage stabilizer 502 is used to sense the output voltage Vo and generate a feedback signal according to the sensed output voltage. The feedback signal is provided for the square wave generator 260 to generate the driving signal for driving the switch circuit 208, thereby stabilizing the output voltage Vo.

Figure 6:
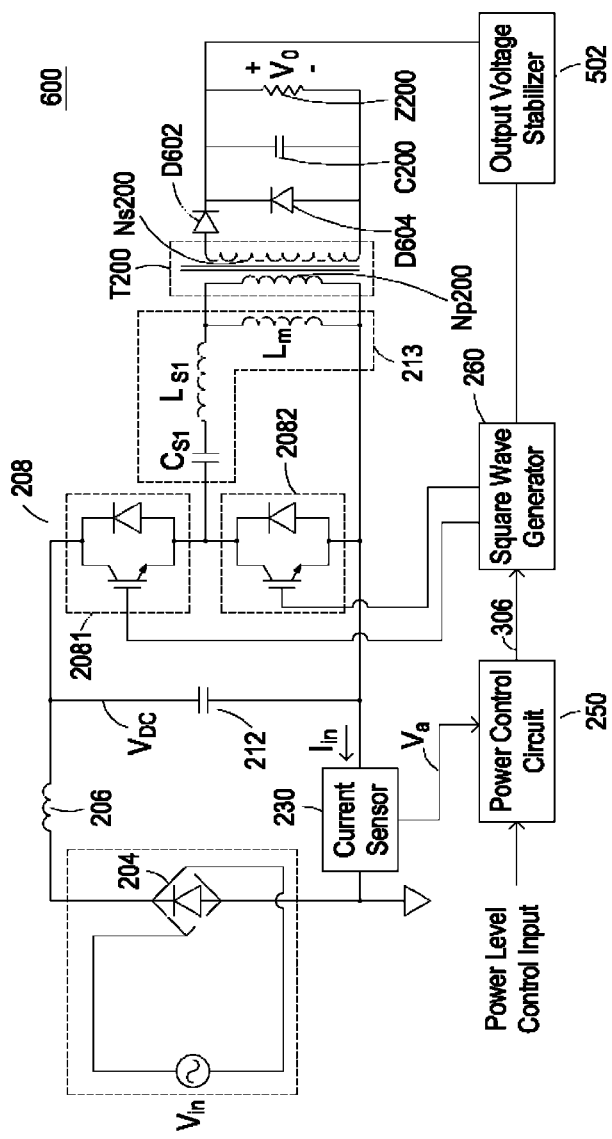
FIG. 6 is a circuit block diagram showing a power supply with a single-stage converter according to a third embodiment of the invention.

FIG. 6 shows the circuit blocks of a power supply 600 according to a third embodiment of the invention. The power supply 600 as shown in FIG. 6 is configured to output a DC voltage Vo with a pair of rectifying diodes D602, D604 placed on the secondary side Ns200 of the transformer T200. The rectifying diodes D602 and D604 are used to rectify the AC voltage induced across the secondary side Ns200 of the transformer T200 into a half-wave rectified DC voltage.

Figure 7:
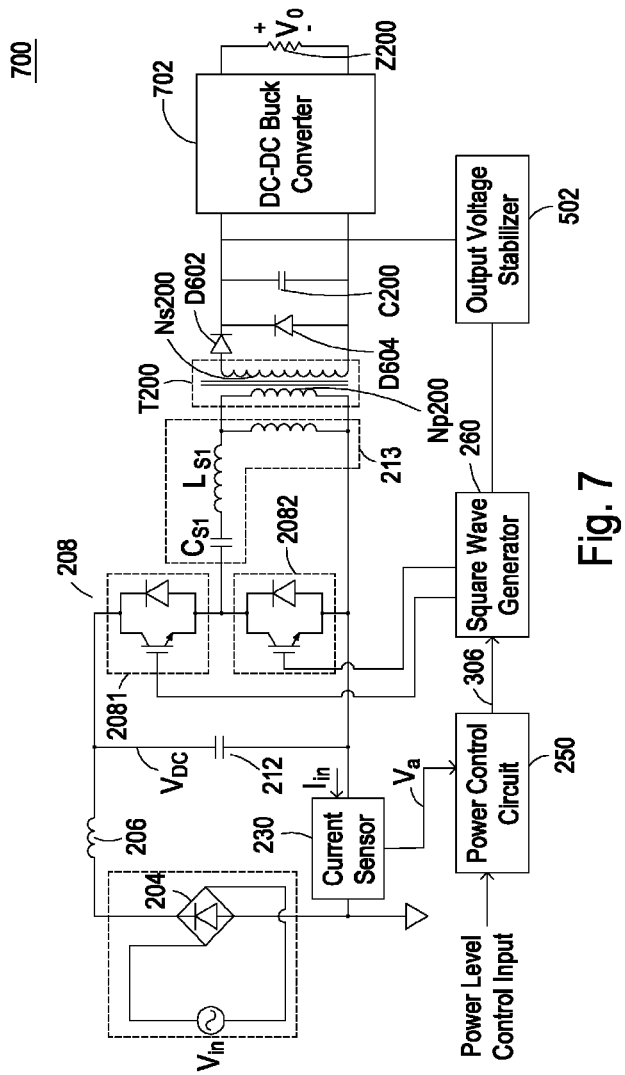
FIG. 7 is a circuit block diagram showing a power supply with a single-stage converter according to a fourth embodiment of the invention.

FIG. 7 shows the circuit blocks of a power supply 700 according to a fourth embodiment of the invention. Compared to the third embodiment of FIG. 6, the power supply 700 shown in FIG. 7 includes an additional DC-DC buck converter 702 which is placed between the output capacitor C200 and the load Z200. The DC-DC buck converter 702 is used to descend the output voltage Vo to a lower DC voltage for powering the load Z200.

Figure 8:
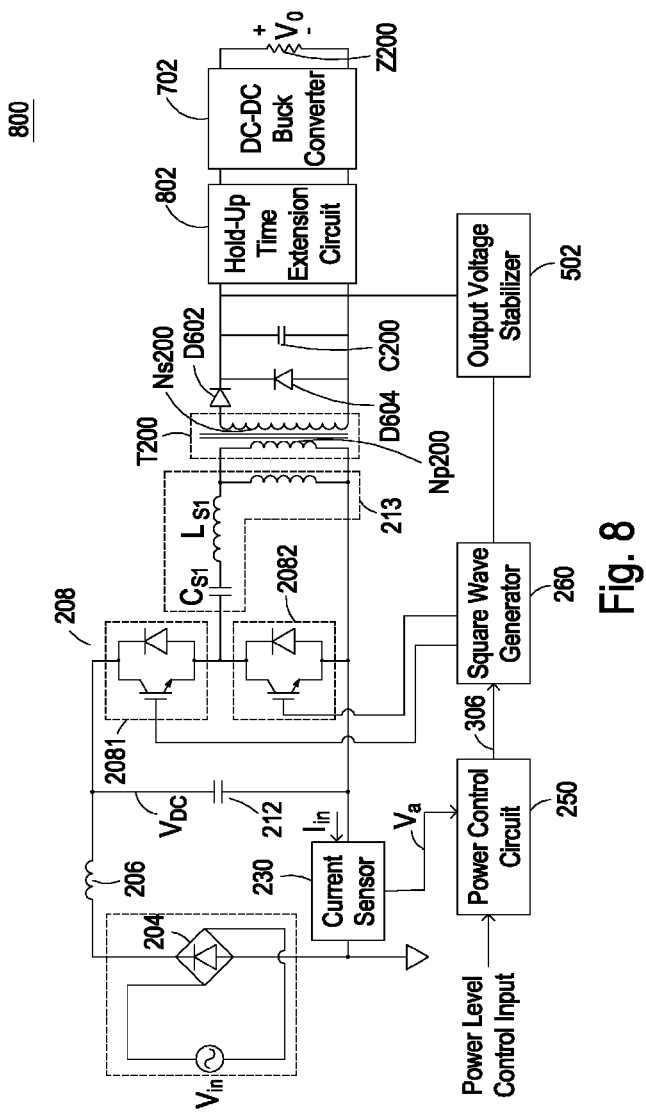
FIG. 8 is a circuit block diagram showing a power supply with a single-stage converter according to a fifth embodiment of the invention.

FIG. 8 shows the circuit blocks of a power supply 800 according to a fifth embodiment of the invention. The power supply 800 shown in FIG. 8 includes an additional hold-up time extension circuit 802 which is placed between the output capacitor C200 and the DC-DC buck converter 702. The hold-up time extension circuit 802 is used to extend the hold-up time of the output capacitor C200.

In conclusion, one embodiment of the invention provides a power supply with a single stage converter for performing power factor correction and resonant conversion. The single stage converter is consisted of a switch circuit, a resonant circuit, a power control circuit, and a square wave generator. The switch circuit includes at least one control switch, and the resonant circuit includes a LLC resonant tank such as a series resonant circuit or a parallel resonant circuit. The power control circuit is implemented by a proportional differential circuit, which is consisted of, for example, a power amplifier configured in a negative feedback topology. The proportional differential circuit is used to compare the input current sensing signal indicative of the sensed input current of the power supply with a power level control input indicative of the desired output power of the power supply, thereby generating a frequency modulation control signal. Therefore, the square wave generator can generate the driving signal for driving the switch circuit. The frequency of the driving signal is varied synchronously with the frequency of the frequency modulation control signal, thereby regulating the output power of the power supply. Accordingly, the power control circuit and the square wave generator can suppress the high-frequency harmonics of the input current to achieve power factor correction. The switch circuit and the resonant circuit can achieve resonant conversion to transfer the energy of the input voltage to the primary side of the transformer. As the power factor correction and resonant conversion are accomplished by a single-stage converter instead of being accomplished by a prior art two-stage converter, the inventive power supply has less circuit elements, lower manufacturing cost, or better power conversion efficiency.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A power supply for converting an input voltage into an output voltage, comprising:
   a switch circuit capable of transferring energy of the input voltage;
   a transformer having a primary side and a secondary side for storing energy transferred from the switch circuit at the primary side and transferring stored energy at the primary side to the secondary side according to a switching operation of the switch circuit, thereby generating the output voltage;
   a resonant circuit connected between the switch circuit and the primary side of the transformer capable of generating resonance to transfer energy of the input voltage to the primary side of the transformer;
   a power control circuit for comparing an input current sensing signal indicative of a sensed input current of the power supply and a power level control input which indicates magnitude of an output power desired by a user for generating a frequency modulation control signal, wherein the frequency modulation control signal is capable of controlling the output power of the power supply and a suppression of harmonics of an input current of the power supply; and
   a square wave generator connected to the power control circuit for generating a driving signal for driving the switch circuit according to the frequency modulation control signal, and wherein a frequency of the driving signal is varied synchronously with a frequency of the frequency modulation control signal, thereby suppressing harmonics of the input current of the power supply and regulating a switching frequency of the switch circuit, so as to regulate an output power of the power supply.

2. A power supply for converting an input voltage into an output voltage, comprising:
   a single stage converter for receiving the input voltage and having a switch circuit capable of transferring energy of the input voltage according to a switching operation of the switch circuit; and
   a transformer connected to the single stage converter and having a primary side and a secondary side for storing energy transferred from the single stage converter at the primary side and transferred energy stored at the primary side to the secondary side according to the switching operation of the switch circuit, thereby generating the output voltage;
   wherein the single stage converter comprises a resonant circuit connected between the switch circuit and the primary side of the transformer for generating resonance to transfer the energy of the input voltage to the primary side of the transformer, and a power control circuit connected to the switch circuit for regulating the switching operation of the switch circuit to suppress harmonics of an input current of the power supply;
   wherein the power control circuit receives a power level control input which indicates the magnitude of the output power desired by a user, and the power control circuit is configured to compare an input current sensing signal indicative of a sensed input current of the power supply and the power level control input capable of generating a frequency modulation control signal for controlling an output power of the power supply and suppress harmonics of the input current of the power supply;
   wherein the single stage converter further comprises a square wave generator connected to the power control circuit for generating a driving signal for driving the switch circuit according to the frequency modulation control signal, in which a frequency of the driving signal is varied synchronously with a frequency of the frequency modulation control signal, thereby suppressing harmonics of the input current of the power supply and regulating a switching frequency of the switch circuit, and regulating the output power of the power supply.

3. The power supply according to claim 2 wherein the resonant circuit includes a series LLC resonant tank or a parallel LLC resonant tank.

4. The power supply according to claim 2 wherein the power control circuit includes a proportional differential circuit.

5. The power supply according to claim 4 wherein the proportional differential circuit includes a power amplifier, a multiplicity of resistors, and a multiplicity of capacitors configured in a negative feedback topology.

6. The power supply according to claim 5 wherein the power control circuit further includes a reverse current isolation device connected between the proportional differential circuit and the square wave generator for preventing a reverse current from flowing from the square wave generator to the proportional differential circuit.

7. The power supply according to claim 2 further comprising an output capacitor connected to the secondary side of the transformer for generating the output voltage.

8. The power supply according to claim 7 further comprising an output voltage stabilizer connected to the output capacitor for detecting the output voltage to output a feedback signal to the square wave generator, thereby driving the square wave generator to regulate the switching operation of the switch circuit for stabilizing the output voltage.

9. The power supply according to claim 8 further comprising a pair of rectifying diodes connected between the secondary side of the transformer and the output capacitor for rectifying energy of the secondary side of the transformer into a half-wave rectified DC voltage.

10. The power supply according to claim 9 further comprising a buck converter connected between the output capacitor and a load for descending the output voltage generated by the output capacitor to a low DC voltage for powering the load.

11. The power supply according to claim 10 further comprising a hold-up time extension circuit connected between the output capacitor and the buck converter for prolonging an extension time of the output capacitor.

12. The power supply according to claim 2, further comprising:
   a bridge rectifier for rectifying the input voltage into a full-wave rectified DC voltage;
   a filter circuit connected to an output end of the bridge rectifier for suppressing electromagnetic interference and high-frequency noises of the input voltage and generating a DC voltage analogous to the full-wave rectified DC voltage or a half-wave rectified DC voltage generated by half-wave rectifying the input voltage; and a current sensor for sensing the input current and generating an input current sensing signal.

13. The power supply according to claim 2 wherein the switch circuit includes a high-side switch and a low-side switch.

\* \* \* \* \*